US010391850B2

(12) United States Patent
Markow

(10) Patent No.: US 10,391,850 B2
(45) Date of Patent: Aug. 27, 2019

(54) MODULE FOR A MOTOR VEHICLE HAVING AN ELECTRIC MACHINE AND A CLUTCH ACTUATING DEVICE

(71) Applicant: ZF Friedrichshafen AG, Friedrichshafen (DE)

(72) Inventor: Alexander Markow, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 378 days.

(21) Appl. No.: 15/308,704

(22) PCT Filed: Mar. 30, 2015

(86) PCT No.: PCT/EP2015/056837
§ 371 (c)(1),
(2) Date: Nov. 3, 2016

(87) PCT Pub. No.: WO2015/169508
PCT Pub. Date: Nov. 12, 2015

(65) Prior Publication Data
US 2017/0190244 A1 Jul. 6, 2017

(30) Foreign Application Priority Data
May 8, 2014 (DE) .................. 10 2014 208 633

(51) Int. Cl.
*H02K 7/108* (2006.01)
*H02K 5/20* (2006.01)
(Continued)

(52) U.S. Cl.
CPC ............ *B60K 6/387* (2013.01); *B60L 3/0061* (2013.01); *H02K 5/00* (2013.01); *H02K 5/20* (2013.01);
(Continued)

(58) Field of Classification Search
CPC ............ H02K 7/006; H02K 7/10; H02K 9/19; H02K 7/108; H02K 7/112; H02K 7/1125;
(Continued)

(56) References Cited

U.S. PATENT DOCUMENTS 6,814,205 B2 * 11/2004 Feldhaus ................. F16D 13/72
180/165
8,425,376 B2 4/2013 Schoenek
(Continued)

FOREIGN PATENT DOCUMENTS

| DE | 10 2008 006 062 A1 | 2/2009 |
| DE | 10 2010 012 707 A1 | 12/2010 |
| EP | 1 027 224 A1 | 8/2000 |
| EP | 1 396 921 A2 | 3/2004 |
| EP | 2 573 910 A1 | 3/2013 |

(Continued)

*Primary Examiner* — Thomas Truong
(74) *Attorney, Agent, or Firm* — Cozen O'Connor

(57) ABSTRACT

An assembly for a motor vehicle has an electric machine and a clutch actuating device. The electric machine has a machine housing, a rotor and a stator. The stator includes a stator carrier with a fluid cooling jacket constructed substantially as an annular space, a fluid inlet, and a fluid outlet spaced apart from the fluid inlet. The stator encloses a central receiving space in which a pressure medium cylinder of the clutch actuating device is arranged. The pressure medium cylinder has a pressure medium inlet arranged inside the axial extension of the stator carrier and can be brought into fluidic connection with, or is fluidically connected with, a pressure source via a pressure medium channel extending from the machine housing. The pressure medium channel is constructed at least partially in a wall portion of the stator carrier adjoining the central receiving space.

9 Claims, 4 Drawing Sheets

(51) Int. Cl.
    *B60K 6/387*     (2007.10)
    *H02K 5/00*     (2006.01)
    *H02K 9/14*     (2006.01)
    *B60L 3/00*     (2019.01)
    *H02K 7/00*     (2006.01)

(52) U.S. Cl.
    CPC ............... *H02K 7/108* (2013.01); *H02K 9/14* (2013.01); *B60L 2240/425* (2013.01); *H02K 7/006* (2013.01); *Y02T 10/641* (2013.01); *Y02T 10/642* (2013.01)

(58) Field of Classification Search
    CPC . H02K 7/114; H02K 9/14; H02K 5/00; H02K 5/20; B60K 6/387; B60L 3/0061; B60L 2240/425; Y02T 10/641; Y02T 10/642
    USPC .............. 310/76, 78, 92, 100, 52, 54, 58, 59
    See application file for complete search history.

(56) References Cited

U.S. PATENT DOCUMENTS

| | | |
|---|---|---|
| 8,978,799 B2 | 3/2015 | Arnold et al. |
| 2011/0012447 A1* | 1/2011 | Himmelmann ........ H02K 7/006 310/54 |
| 2012/0080248 A1* | 4/2012 | Kasuya .................... B60K 6/40 180/65.21 |

FOREIGN PATENT DOCUMENTS

| | | | | |
|---|---|---|---|---|
| FR | 2814121 A1 * | 3/2002 | ............... | B60K 6/26 |
| FR | 2814121 A1 | 3/2002 | | |

* cited by examiner

MODULE FOR A MOTOR VEHICLE HAVING AN ELECTRIC MACHINE AND A CLUTCH ACTUATING DEVICE

CROSS-REFERENCE TO RELATED APPLICATIONS

This is a U.S. national stage of application No. PCT/EP2015/056837, filed on 30 Mar. 2015, which claims priority to the German Application No. 10 2014 208 633.7, filed 8 May 2014, the content of both incorporated herein by reference.

BACKGROUND OF THE INVENTION

1. Field of the Invention

The present invention is directed to a constructional unit (e.g., assembly) for a motor vehicle having an electric machine and a clutch actuating device.

2. Related Art

A generic constructional unit in which an actuating cylinder operated by a pressure medium is formed in a central receiving space of the stator of the electric machine for actuating an axially adjacent friction clutch is known from DE 10 2010 012 707 A1. A pressure medium channel, which is formed in a separate tubular pressure line element, is provided for supplying the actuating cylinder with a pressure medium. The pressure line element is guided radially inward proceeding from a machine housing of the electric machine and, in doing so, traverses an annular cooling jacket of the stator substantially in radial direction. This mode of construction has been found to be very laborious as well as problematic because the pressure line element must be guided through opposite the cooling jacket such that it is sealed at two positions.

SUMMARY OF THE INVENTION

An object of the present invention is to form a constructional unit (assembly) of the type mentioned above that economizes on installation space and also to operates more reliably with respect to the pressure medium channel and the fluid cooling jacket.

This object can be met, for example, by a constructional unit for a motor vehicle having an electric machine and a clutch actuating device in which the electric machine has a machine housing, a rotor and a stator, and in which the stator comprises a stator carrier with a fluid cooling jacket constructed substantially as an annular space, a fluid inlet, and a fluid outlet spaced apart from the fluid inlet. The stator encloses a central receiving space in which a pressure medium cylinder of the clutch actuating device is arranged. This pressure medium cylinder has a pressure medium inlet arranged inside the axial extension of the stator carrier and which can be brought into fluidic connection with, or is fluidically connected with, a pressure source via a pressure medium channel extending from the machine housing.

According to an aspect of the invention, in the constructional unit the pressure medium channel is constructed at least partially in a wall portion of the stator carrier adjoining the receiving space, i.e., inside the body and in the material of the stator carrier itself. The pressure medium channel, or a portion of the pressure medium channel, can be incorporated into this wall portion, e.g., by casting techniques or by one or more bore holes. The pressure medium cylinder can be constructed as a fluid cylinder or as a pneumatic cylinder.

Thus a separate pressure line element is not required and the construction of the constructional unit can be simplified. In the proposed manner, by forming the pressure medium channel in the solid material of the stator carrier, leakiness can practically be completely eliminated from the start.

The proposed solution can be realized in diverse ways. For example, the pressure medium channel can be formed at least partially outside of the radial extension of the cooling jacket, preferably with axial extension and adjacent to the cooling jacket at the stator carrier.

Alternatively, depending on the specific configuration of the wall portion, the pressure medium channel can also be formed at the stator carrier entirely or partially inside the radial extension of the cooling jacket.

In one aspect, regardless of the radial configuration of the pressure medium channel, there is an axial overlapping of the pressure medium channel and the fluid cooling jacket because the pressure medium inlet of the pressure medium cylinder is provided inside the axial extension of the stator carrier.

In another aspect, a further portion of the pressure medium channel running in radial direction from the machine housing toward the receiving space can be located either at the stator carrier itself or at an element adjacent thereto, for example, an intermediate wall, in a coplanar manner inside of, or at an offset to, a surface area defined by a coolant feed line and a coolant drain line.

Advantageous configurations and further developments of the invention follow from the following.

According to a first advantageous configuration of the constructional unit, it is provided that the stator carrier wall portion with the pressure medium channel extends radially into the annular space of the cooling jacket. Accordingly, the radial extension of the stator carrier can be kept comparatively small, on the one hand, so that the receiving space can be optimized for receiving the pressure medium cylinder, on the other hand. The aforementioned wall portion with the pressure medium channel can be formed over only a portion of, or over the entirety of, the axial extension of the cooling jacket. Likewise, the wall portion can be formed either only partially or entirely over the radial extension of the cooling jacket. In the latter case, for example, the pressure medium channel can traverse the fluid cooling jacket or the radial region thereof. For the fluid flowing in the cooling jacket, the wall portion of the stator carrier with the pressure medium channel constitutes a barrier, which initially increases the effective operative cooling surface and which can be operative as a fluid conducting element for selectively influencing the fluid flow. In principle, the wall portion with the pressure medium channel can be formed at any circumferential position of the cooling jacket.

According to a preferred variant, the wall portion with the pressure medium channel can be formed in the mutual spacing area between the fluid inlet and fluid outlet of the fluid cooling jacket. At this position, the wall portion acts as a fluid dividing element and prevents cooling fluid from passing directly from the inlet to the outlet without flowing through the annular space. However, it can be provided in this case that in order to form the flow bypass the above-mentioned wall portion only fills most of the cross section of the cooling jacket and leaves open a small portion of the cross section for passage of a partial fluid flow. This step inhibits the formation of a hotspot in the region of the fluid inlet and fluid outlet of the cooling jacket.

According to a preferred and simple mode of construction, for forming the fluid cooling jacket the stator carrier includes two wall elements, which are arranged coaxial to one another. The two wall elements define between themselves the above-mentioned annular space, and one of the wall elements bounds the receiving space, and the wall portion with the pressure medium channel is constructed in the wall element bounding the receiving space. To produce a sealing connection, the wall elements, after being joined, can be welded, for example, or also mutually clamped when sealing elements are used. One of the wall elements bounds the receiving space provided for arranging the pressure medium cylinder, while a stator lamination stack can be fixed at the other respective wall element. The wall portion with the pressure medium channel arranged in the annular space is provided particularly at the wall element that bounds the receiving space for arranging the pressure medium cylinder.

Yet another advantage consists in that the pressure medium cylinder with a cylinder housing and with a piston axially displaceable therein can be formed in its entirety as a separate, preassembled functional unit fixed to the stator carrier when the unit is assembled. The pressure medium inlet of the pressure medium cylinder is aligned with a pressure medium outlet provided at the stator carrier to produce a fluid connection.

The wall element bounding the receiving space is preferably constructed with a radial wall portion contacted by the cylinder housing of the pressure medium cylinder and can be supported there during an axial release movement of the piston. Accordingly, the pressure medium channel can be guided further in the stator carrier from an entrance orifice to an exit orifice of the radial wall portion, wherein the exit orifice is located opposite the pressure medium inlet of the pressure medium cylinder in an installed condition. Accordingly, the exit orifice and the pressure medium inlet form a first transfer point for the pressure medium and can be positioned axially, radially or at an angle to one another in a simple manner.

According to a further favorable configuration, it can be provided that the machine housing has an intermediate wall, which extends radially in direction of the stator carrier and which contacts the stator carrier and in which the pressure medium channel, a coolant feed channel communicating fluidically with the fluid inlet, and a coolant drain channel communicating fluidically with the fluid outlet, are formed.

All of the above-mentioned channels can be connected in this way to a pressure medium connection or coolant connections located outside of the constructional unit and which run from the respective connection position preferably located radially outside of the electric machine in direction of the receiving space to the exit orifices of these channels provided at the latter. The entrance orifice of the pressure medium channel at the stator carrier and the exit orifice of the pressure medium channel at the radially extending wall portion form a further transfer point for the pressure medium. This pair of orifices can again be positioned axially, radially or at an angle. This configuration applies in an analogous manner to the two coolant channels mentioned above.

Further, the pressure medium cylinder can be arranged at a radially inner, axially extending tube extension of the radial wall portion, particularly at the outer circumferential surface thereof, and can be fixed and centered radially between the latter and the wall element bounding the receiving space. In another embodiment, the inner circumferential surface of the tube extension can form a bearing for supporting the rotor of the electric machine and, in yet another respect, can form a bearing for supporting a driveshaft guided in the constructional unit.

To achieve a compact constructional unit, a clutch arrangement that can be actuated by the pressure medium cylinder is arranged axially adjacent to the electric machine. This clutch arrangement can preferably be constructed as a friction clutch and can serve to produce a rotary driving connection between an output shaft connected to the rotor of the electric machine and a driveshaft guided through the electric machine.

BRIEF DESCRIPTION OF THE DRAWINGS

The invention will be described by way of example in the following referring to an embodiment form shown in the drawings. In the drawings.

DETAILED DESCRIPTION OF THE PRESENTLY PREFERRED EMBODIMENTS

Figure 1:
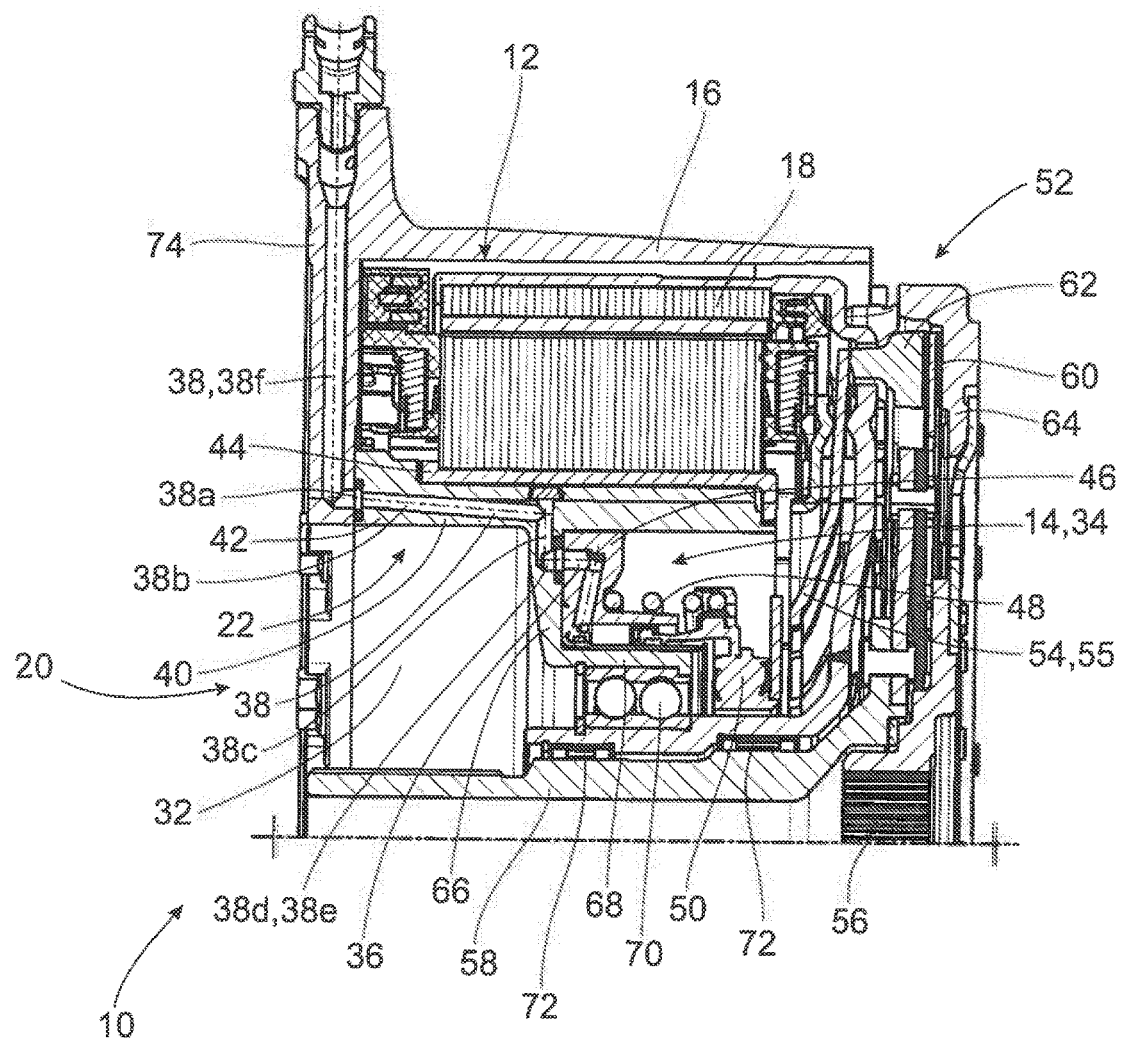
FIG. 1 is a partial axial section through a constructional unit for a motor vehicle having an electric machine and a clutch actuating device with a pressure medium channel.
Figure 2:
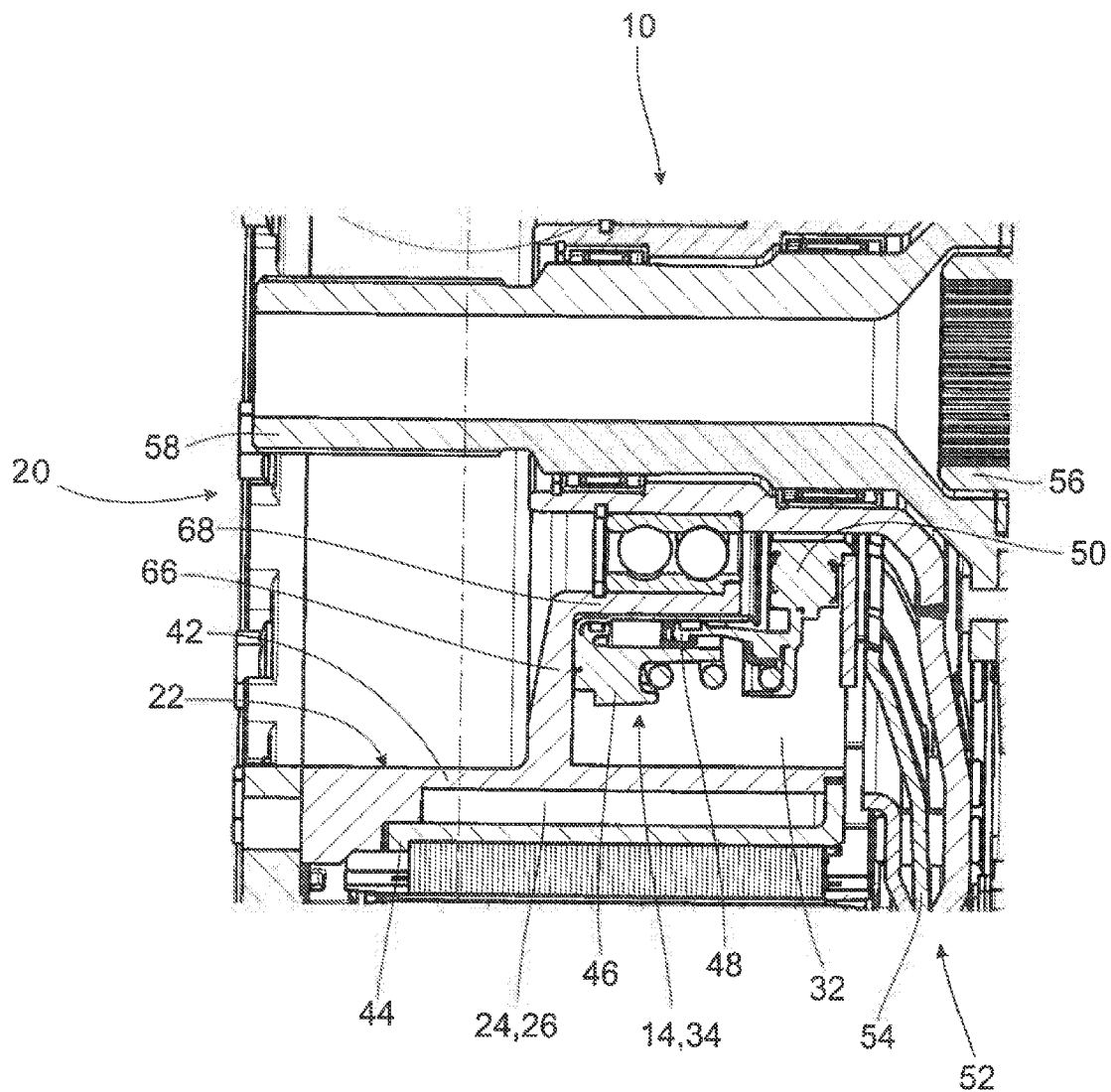
FIG. 2 is a partial axial section through the constructional unit from FIG. 1 in the region of a fluid cooling jacket.
Figure 3:
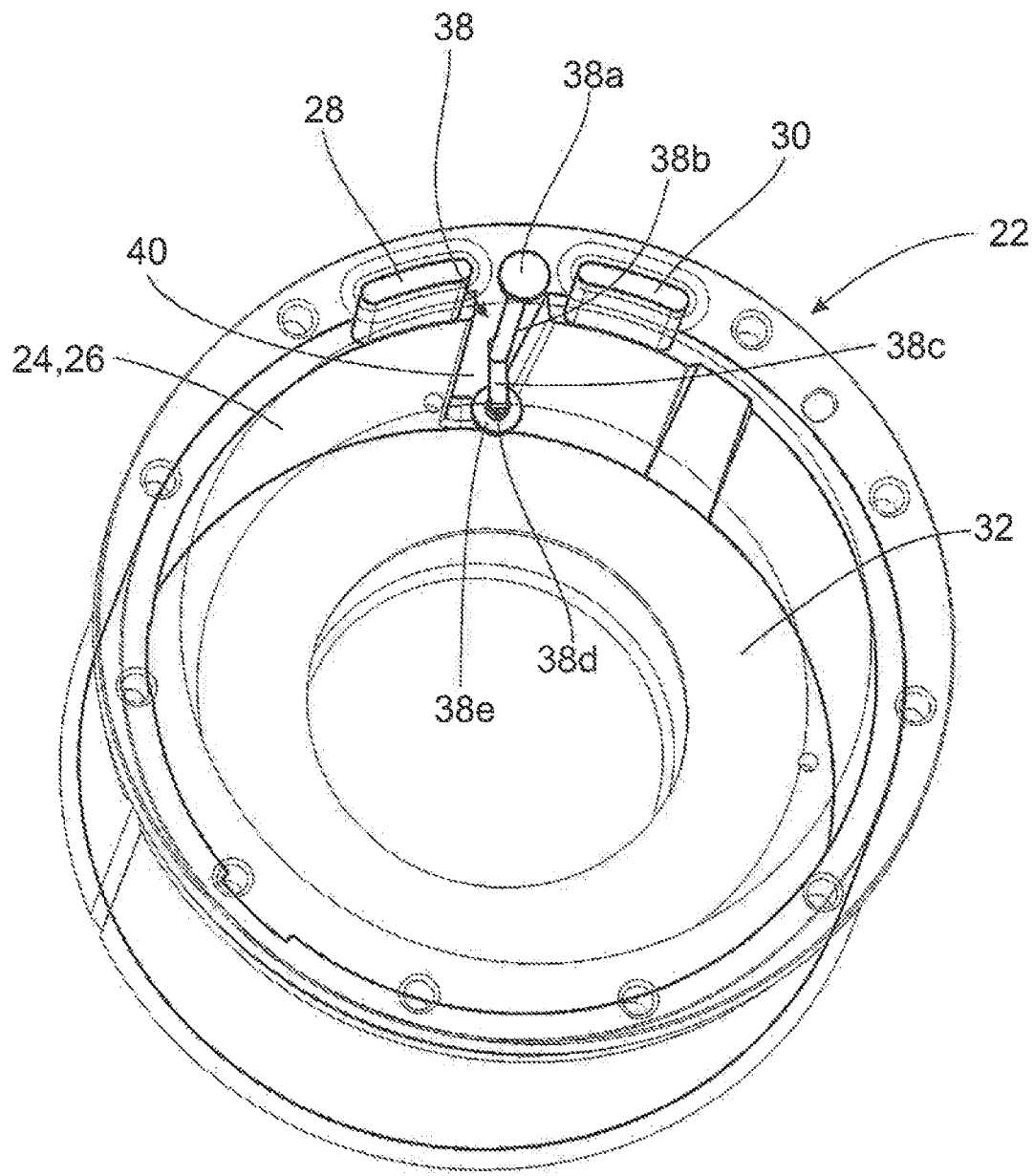
FIG. 3 is a perspective view of a stator carrier of the constructional unit from FIG. 1 with a fluid cooling jacket formed therein and a pressure medium channel.

Like objects and functional units or comparable components are denoted by identical reference numerals throughout the different drawings. Further, collective reference numerals may be used for components and objects which occur more than once in an embodiment example or diagram but which are described collectively with respect to one or more features. Components or objects denoted by identical reference numerals or collective reference numerals may be constructed identically or possibly also differently with respect to one or more or all features, for example, their dimensions, unless otherwise explicit or implicit from the description.

The drawings show a constructional unit 10 (assembly) for a motor vehicle having an electric machine 12 and a clutch actuating device 14. The electric machine 12 has a machine housing 16, a rotor 18 and stator 20. The stator 20 is supported by a stator carrier 22 in which are provided a fluid cooling jacket 26, which is constructed substantially as annular space 24, a fluid inlet 28 and a fluid outlet 30 at a distance from the fluid inlet 28. It can be seen that the stator 20 with its stator carrier 22 encloses a central receiving space 32 in which a pressure medium cylinder 34 of the clutch actuating device 14 is arranged. This pressure medium cylinder 34 has a pressure medium inlet 36 which is arranged within the axial extension of the stator carrier 22 and which can be brought into, or is in, fluidic connection with a pressure source, for example, a master cylinder, not shown, via a pressure medium channel 38, which runs from the machine housing 16 and which, in this instance, is formed of multiple parts. As can be seen from FIG. 1, the pressure medium channel 38 is formed at least partially in a wall portion 40 of the stator carrier 22 adjoining the receiving space 32.

To form the fluid cooling jacket 26, the stator carrier 22 comprises two wall elements 42, 44 which are arranged coaxial to one another and which define between themselves the annular space 24 of the fluid cooling jacket 26. The radially inner wall element 42 bounds the central receiving space 32. It can further be seen that the wall portion 40 with the pressure medium channel 38 is constructed in the wall element 42 limiting the receiving space 32 and that this wall portion 40 extends radially into the annular space 24 of the cooling jacket 26. In particular, the wall portion 40 with the pressure medium channel 38 is formed in the mutual, in this case circumferential, spacing area between the fluid inlet 28 and fluid outlet 30 of the fluid cooling jacket 26.

In the present instance, the pressure medium cylinder 34 is constructed as a preassembled functional unit and particularly as a concentric slave cylinder 34 and has a housing 46 separate from the stator carrier 22 and has the pressure medium inlet 36, and a displaceable piston 48 with a known release bearing 50, which is only shown schematically. The release bearing 50 serves for rotational decoupling between the piston 48 and a clutch arrangement 52, which is arranged axially adjacent to the electric machine 12 and which can be actuated by the pressure medium cylinder 34. In particular, one of the bearing rings of the release bearing 50 contacts the piston 48 and the other bearing ring contacts a release member 55 of the clutch arrangement 52, which is provided in this case as a friction clutch, this release member 55 being constructed as a diaphragm spring 54. The clutch arrangement 52 serves to produce a rotational driving connection between an output shaft 56 connected to the rotor 18 of the electric machine 12 and a driveshaft 58 which is guided through the electric machine 12 and which carries a friction disk 60 for this purpose. This friction disk 60 is clamped in a frictionally engaging manner between an axially displaceable clutch cover 62, which cooperates with the diaphragm spring 54, and a pressure plate 64, which is connected to the output shaft 56.

The cylinder housing 46 of the pressure medium cylinder 34 is supported axially at a radial wall portion 66 of the wall element 42 bounding the receiving space 32 and is simultaneously received or arranged at the outer circumferential surface of a radially inner tube extension 68 of the radial wall portion 66. With its inner circumferential surface, the tube extension 68 simultaneously forms a bearing for supporting the rotor 18 of the electric machine 12 by a rolling element bearing 70 arranged at the latter and, in yet another respect, forms a bearing for supporting the driveshaft 58 guided in the constructional unit 10 by two axially spaced rolling element bearing units 72.

The pressure medium channel 38 is formed in the wall element 42 in an approximately z-shaped manner and, to this end, has a first portion 38*b* extending virtually axially in the wall element 40 proceeding from an entrance orifice 38*a*, a second portion 38*c* passing radially into the radial wall portion 66 and a third portion 38*d* extending approximately axially. The latter opens into the exit orifice 38*e*, which is arranged axially adjacent to the pressure medium inlet 36 of the pressure medium cylinder 34. The above-mentioned three portions 38*b*, 38*c*, 38*d* are constructed respectively as pocket bores. The radially extending portion 38*c* serves to connect the further portions 38*b* and 38*d*. The inlet area of portion 38*c*, or of the borehole located in the region of the fluid cooling jacket 26, is closed, e.g., welded, so as to be tight against fluid on the side of the annular space 24 such that coolant and pressure medium are reliably prevented from entering each other's respective fluid system. The exit orifice 38*c* and pressure medium inlet 36 accordingly form a first transfer point for the pressure medium.

Figure 4:
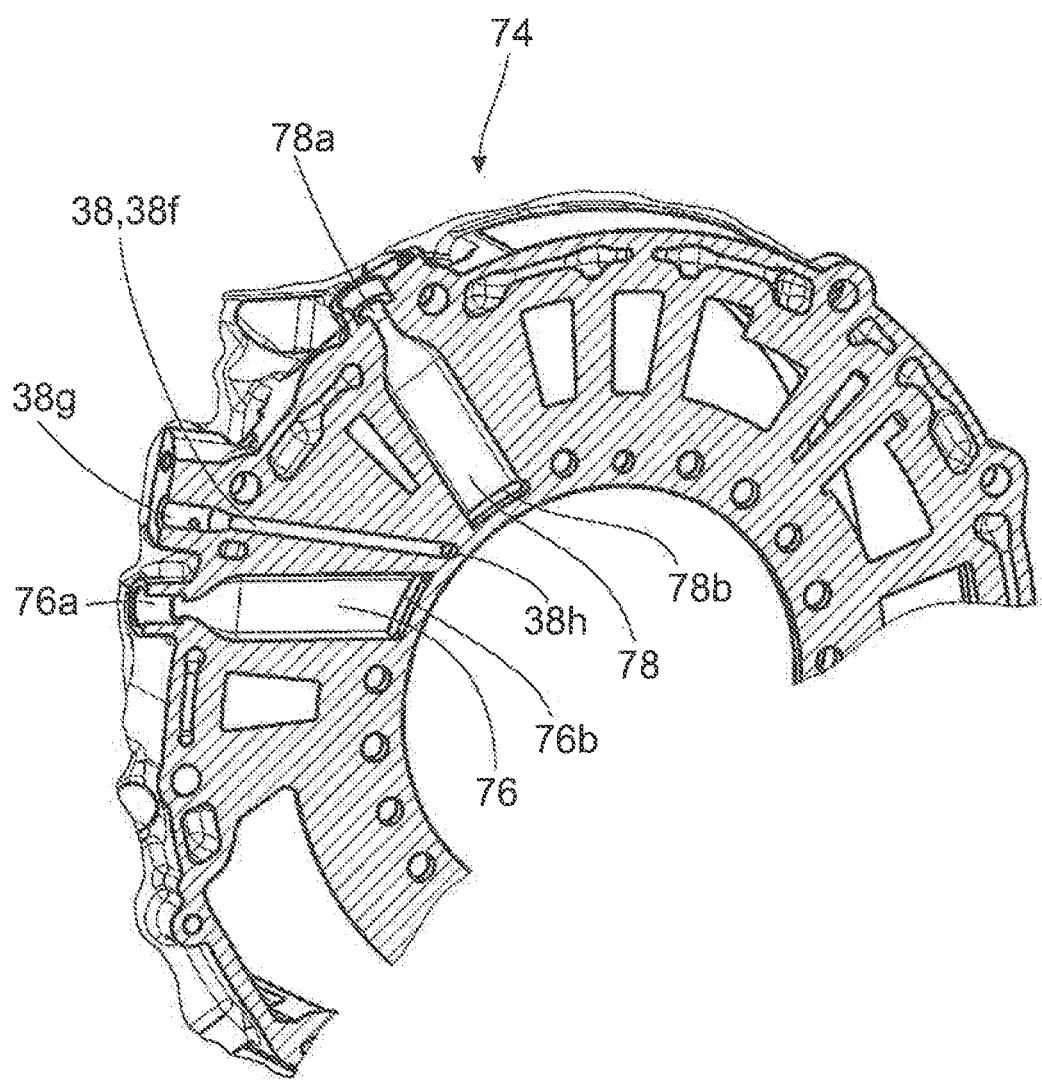
FIG. 4 is a partial lateral section through an intermediate wall of the constructional unit from FIG. 1 with a pressure medium channel guided therein and with a coolant feed channel and a coolant drain channel.

It can be seen from FIGS. 1 and 4 that the machine housing 16 has an intermediate wall 74 that extends radially in direction of the stator carrier 22 and contacts the latter, and in which there are formed a portion 38*f* of the pressure medium channel 38, a coolant feed channel 78 fluidically connected to the fluid inlet 28 and a coolant drain channel 76 fluidically connected to the fluid outlet 30. The pressure medium channel 38 is also arranged with a portion 38*f* between the coolant feed channel 78 and the coolant drain channel 76, in the present case particularly circumferentially between the coolant feed channel 78 and the coolant drain channel 76, and is arranged with the latter in a common cross-sectional plane.

The pressure medium channel 38, which is guided in the stator carrier 22 and the fluid cooling jacket 26, can be connected by the intermediate wall and channels 38*f*, 76, 78, for example, to pressure medium lines and coolant lines guided outside of the constructional unit 10. The channels 38*f*, 76, 78 run from the respective connection positions on the outside of the machine housing 16 or from corresponding entrance orifices 38*g*, 76*a*, 78*a* in direction of the receiving space to exit orifices 38*h*, 76*b*, 78*b* of these channels provided at the latter. The entrance orifice 38*a* of the pressure medium channel 38 at the stator carrier 22 and the exit orifice 38*h* of the pressure medium channel 3 form a further, second transfer point for the pressure medium at the intermediate wall 74. This pair of orifices 38*a*, 38*h* is in turn positioned axially relative to one another in the present instance. This configuration applies in an analogous manner to the two coolant channels 76, 78. Corresponding sealing is provided at the transfer points in a conventional manner.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

REFERENCE NUMERALS 10 constructional unit
12 electric machine
14 clutch actuating device
16 machine housing
18 rotor
20 stator
22 stator carrier
24 annular space
26 fluid cooling jacket
28 fluid inlet
30 fluid outlet
32 receiving space
34 pressure medium cylinder
36 pressure medium inlet
38 pressure medium channel
38*a* entrance orifice
38*b, c, d* pressure medium channel portion
38*e* exit orifice 38*f* pressure medium channel portion
38*g* entrance orifice
38*h* exit orifice
40 wall portion
42, 44 wall element
46 housing
48 piston
50 release bearing
52 clutch arrangement
54 diaphragm spring
55 release member
56 output shaft
58 driveshaft
60 friction disk
62 clutch cover
64 pressure plate
66 radial wall portion
68 tube extension
70, 72 rolling dement bearing
74 intermediate wall
76 coolant drain channel
76*a* entrance orifice
76*b* exit orifice
78 coolant feed channel
78*a* entrance orifice
78*b* exit orifice

The invention claimed is:

1. An assembly (10) for a motor vehicle, the assembly (10) comprising:
    an electric machine having:
        a machine housing (16),
        a rotor (18), and
        a stator (20); and
    a clutch actuating device (14) having a pressure medium cylinder (34),
    wherein the stator (20) includes a stator carrier (22) having a fluid cooling jacket (26), the fluid cooling jacket (26) comprising an annular space (24), a fluid inlet (28), and a fluid outlet (30) spaced apart from the fluid inlet (28),
    wherein the stator (20) encloses a central receiving space (32) in which the pressure medium cylinder (34) of the clutch actuating device (14) is arranged,
    wherein the pressure medium cylinder (34) has a pressure medium inlet (36) arranged inside an axial extension of the stator carrier (22) and which is fluidically connectable with a pressure source via a pressure medium channel (38) extending from the machine housing (16), and
    wherein the pressure medium channel (38) is constructed at least partially in a wall portion (40) of the stator carrier (22) adjoining the central receiving space (32).

2. The assembly according to claim 1, wherein the wall portion (40) extends radially into the annular space (24) of the fluid cooling jacket (26).

3. The assembly according to claim 1, wherein the wall portion (40) is arranged in a mutual spacing area arranged between the fluid inlet (28) and fluid outlet (30) of the fluid cooling jacket (26).

4. The assembly according to claim 1, wherein the stator carrier (22) includes a first wall element (42) and a second wall element (44) arranged coaxial to one another and which first and second wall elements define between themselves the annular space (24) of the fluid cooling jacket (26), and wherein the first wall element (42) bounds the central receiving space (32), and wherein the wall portion (40) with the pressure medium channel (38) is constructed in the first wall element (42) bounding the central receiving space (32).

5. The assembly according to claim 4, wherein the pressure medium inlet (36) of the pressure medium cylinder (34) is arranged at a cylinder housing (46) arranged separately from the stator carrier (22).

6. The assembly according to claim 5, wherein the cylinder housing (46) is supported on a radial wall portion (66) of the first wall element (42) bounding the central receiving space (32), and the pressure medium channel (38) extends at least partially in the first wall element (42) and opens into the pressure medium inlet (36) of the pressure medium cylinder (34) in the region of the radial wall portion (66).

7. The assembly according to claim 1, wherein the machine housing (16) has an intermediate wall (74) extending radially in a direction of the stator carrier (22) and contacting the stator carrier (22) and in which intermediate wall (74) the pressure medium channel (38), a coolant feed channel (78) communicating fluidically with the fluid inlet (28), and a coolant drain channel (76) communicating fluidically with the fluid outlet (30) are formed.

8. The assembly according to claim 6, wherein the pressure medium cylinder (34) is arranged at a radially inner tube extension (68) of the radial wall portion (66).

9. The assembly according to claim 1, further comprising a clutch arrangement (52), actuatable by the pressure medium cylinder (34), arranged axially adjacent to the electric machine (12).

* * * * *